United States Patent
Bonkhoff et al.

[11] Patent Number: 6,063,281
[45] Date of Patent: May 16, 2000

[54] EXTRACTION OF ORGANIC COMPOUNDS FROM SURFACTANTS-CONTAINING AQUEOUS SOLUTIONS

[75] Inventors: Karin Bonkhoff, Düsseldorf; Franz-Hubert Haegel, Düren; Silke Kowalski, Düsseldorf; Günter Subklew, Herzogenrath, all of Germany

[73] Assignee: Forschungszentrum Jülich GmbH, Jülich, Germany

[21] Appl. No.: 09/165,140

[22] Filed: Oct. 1, 1998

Related U.S. Application Data

[63] Continuation-in-part of application No. PCT/DE97/00665, Apr. 1, 1997.

[51] Int. Cl.⁷ .......................... B01D 11/04; B01D 17/038
[52] U.S. Cl. .......................... 210/638; 210/705; 210/712; 210/738; 210/749; 210/787; 210/805; 494/37
[58] Field of Search .................. 210/380.1, 634, 210/638, 702, 705, 712, 738, 749, 767, 781, 787, 805; 494/37, 49, 52, 84

[56] References Cited

U.S. PATENT DOCUMENTS

| | | | |
|---|---|---|---|
| 4,948,512 | 8/1990 | Gotlieb et al. | 210/705 |
| 5,110,733 | 5/1992 | Kim et al. | 210/634 |
| 5,453,192 | 9/1995 | Dolfus | 210/380.1 |

*Primary Examiner*—David A. Reifsnyder
*Attorney, Agent, or Firm*—Klaus J. Bach

[57] ABSTRACT

In a process for the extraction of organic compounds contained in an aqueous solution of non-ionic surfactants which contain the organic compounds to be extracted, the aqueous solution is intensely mixed with a liquid which is not miscible with water whereby the organic compounds transfer to the liquid which is not miscible with water, and the blend of the aqueous solution and the liquid which is not miscible with water is then separated, the mixing and the separation process being performed in a centrifugal extractor.

4 Claims, No Drawings

EXTRACTION OF ORGANIC COMPOUNDS FROM SURFACTANTS-CONTAINING AQUEOUS SOLUTIONS

This is a Continuation-in-Part application of international appl. PCT/DE97/00665 filed Apr. 1, 1997, now WO 97/37742 published Oct. 16, 1997 and claiming the priority of German application 196 13 485.4 filed Apr. 4, 1996.

BACKGROUND OF THE INVENTION

The invention relates to the extraction of organic compounds from aqueous solutions of non-ionic surfactants.

Organic noxious compounds are present in the soil as liquids or solids or they are attached to soil particles (adsorbed). For soil reclamation, these organic compounds (noxious materials) can be washed out of the soils by using aqueous surfactant-containing solutions. As a result of such procedures, for example, aqueous solutions of non-ionic surfactants in which organic compounds are dissolved are present. In order to permit the solutions of non-ionic surfactants to be reused the organic compounds must be extracted from the aqueous surfactants-containing solutions.

From the publication, J. L. Underwood, K. A. Debalak, D. J. Wilson, Sep. Sci-Technol. 1993, 28(9) 1647–1669 "SOIL CLEANUP BY IN-SITU SURFACTANT FLUSHING, VI RECLAMATION OF SURFACTANT FOR RECYCLE", it is known to extract organic substances (compounds) from ionic surfactants by way of liquid—liquid extraction. It is specifically pointed out that a liquid—liquid extraction is possible because exclusively solutions of ionic surfactants—but not solutions of non-ionic surfactants are employed.

It is well known in the field that non-ionic surfactants facilitate the formation of emulsions. It is also well known in the field that the separation of such emulsions is impossible or at least very expensive. It is furthermore well known that the formation of emulsions has disadvantageous effects on the liquid—liquid extractions. For this reason, the liquid—liquid extraction was considered by the state of the art to be possible only for solutions of ionic surfactants.

Nevertheless, inspite of the strong emulsion forming tendencies and the difficulties connected therewith, a liquid—liquid extraction of non-ionic surfactants from solutions was basically considered to be possible as apparent from the publication, K. Bankhoff, M. Wittmann, F. H. Haegel, G. Subklew, "EXTRAKTION VON POLYZYKLISCHEN AROMATISCHEN KOHLEN-WASSERSTOFFEN AUS BELASTETEN BÖDEN", published in Fremdstoffe in Böden—Akkumulation, Bioverfügbarkeit, Bewertungsansätze, Publisher: Arbeitsgemeinschaft der Grossforschungseinrichtungen (AGF), Bonn, 1994, 34–36. From this publication, it is not known however how such a liquid—liquid extraction of organic compounds from solutions of non-ionic surfactants is possible and whether such a process is economically feasible.

EP 0 432 651 A1 and DE 39 15 930 disclose the extraction of noxious materials by vegetable oils. However, there is no indication in these publications whether or how the solutions of non-ionic surfactants can be reclaimed.

It is the object of the present invention to provide an economically feasible method for the extraction of organic compounds from solutions of non-ionic surfactants, which permits particularly high volume processing.

SUMMARY OF THE INVENTION

In a process for the extraction of organic compounds contained in an aqueous solution of non-ionic surfactants which contain the organic compounds to be extracted, the aqueous solution is intensely mixed with a liquid which is not miscible with water whereby the organic compounds transfer to the liquid which is not miscible with water, and the blend of the aqueous solution and the liquid which is not miscible with water are then separated, the mixing and the separation process being performed in a centrifugal extractor.

The aqueous solution of non-ionic surfactants (which contains the organic compounds to be extracted) is intensely mixed with a liquid which is not miscible with water.

Mixing in this connection is to be understood as a turbulent blending that is the providing of a blend of the liquids. Since the two liquids cannot be mixed, that is, neither one can be dissolved in the other, a blend is formed which is not a homogeneous mixture. A homogeneous mixture is formed when two liquids are used which can be mixed, that is two liquids which form a solution.

Intense mixing is to be understood to refer to a mixture wherein a large area of interface has been formed between the two liquids as it is generally formed by a mixture provided by a centrifugal extractor. With such an intense mixing process, the particle sizes of the disperse phases in the blend are typically 0.1 to 10 µm.

For comparison herewith, a low intensity mixture is a mixture as it is typically provided by a simple extraction column wherein one phase flows through the other. With a low intensity mixture, the particle size of the disperse phase is typically 100 µm to 10 mm.

As a result of the large area of interface, the organic compounds pass at a high transfer rate from the surfactant-containing aqueous solution to the liquid which is not miscible with water.

Subsequently, the surfactant containing aqueous solution is separated from the solution which does not mix with water. The solution which does not mix with water now contains the organic compounds.

Consequently, the organic compounds have been extracted from the aqueous solution. A (vegetable) oil or a fatty acid ester is a suitable liquid which does not mix with water. Because of intense mixing, the liquids however are emulsified substantially beyond the normal rate. On the basis of the general expert knowledge and the knowledge of the state of the art as referred to earlier, it could be expected that, because of the increased emulsification, a separation would practically be impossible. However, it has been found surprisingly that the advantages of an intense mixing are greater than the disadvantages encountered during separation.

With the intense mixing, a high extraction performance can be achieved. Because of the high extraction performance, the method can be performed economically. The separation of the intensely mixed liquids is economically possible particularly by centrifuging.

A separation can be performed economically if the interfacial tension between the aqueous solution and the organic phase (organic compound) is sufficiently high. The use of the method should therefore be limited to cases where the interfacial tension is at least 1.5 mn.

For performing the method, preferably a centrifugal extractor is utilized. In a centrifuge reactor, an aqueous solution of non-ionic surfactants is first mixed with a fatty acid ester, for example. After mixing of the two liquids, the two phases of the mixture formed thereby (emulsion) are separated again by centrifuging. Particularly, alkyl polyglycol ether with a sufficient ethoxylisation degree has a sufficiently high interfacial tension in connection with an aqueous solution. The alkyl polyglycol ethers known under the brand name Marlipal 24/100 to 24/200 of the company Hüls meet the specifications mentioned earlier.

In another embodiment of the invention, the liquid which does not mix water is partially circulated in a flow circuit.

After separation, a part of the liquid which does not mix with water and to which the organic compounds have been transferred by the method is enriched with an amount of the fresh or decontaminated liquid which does not mix with water. This mixture is then used for the intense mixing step. In this way, the method is improved in economically and environmentally advantageous respects.

It is advantageous if the method is performed with an oil-in-water micro emulsion (O/W-$\mu$E), which includes as the aqueous solution non-ionic surfactants. Oil in water-micro-emulsions are thermodynamically stable mixtures of water, non-ionic surfactants and a liquid which does not mix with water. They are used according to the method of the invention for the liquid—liquid extraction. In the mixture, the part of the liquid which does not mix with water is of such a volume that the mixture acts in a thermodynamically stable manner.

In accordance with the invention, the organic compounds are extracted from this oil-in-water micro-emulsion. If oil-in-water micro-emulsion are used, the extracted O/W-$\mu$E can again be used without reprocessing steps.

For example, organic compounds (noxious materials) can be washed out of soils by using an oil-in-water micro-emulsion. Subsequently, the noxious materials is removed from the oil-in-water micro-emulsion by the process according to the invention. The oil-in-water emulsion can then again be used for the soil remediation.

The claimed process is suitable for recovering valuable materials from surfactant-containing solutions as well as for the removal of undesirable compounds such as noxious materials by in-situ soil washing.

Below the invention will be described in greater detail on the basis of some examples.

DESCRIPTION OF EXAMPLES OF THE PROCESS ACCORDING TO THE INVENTION

A solution of 29 mg/l pyrene in an oil-in-water microemulsion (O/W-$\mu$E) with 1% Marlipal 24/200 saturated with rape methyl ester was extracted with pure rape methyl ester in a centrifugal extractor LX 124 of the firm Robatel. The interfacial tension between the surfactant-containing solution and the rapemethylester was 1.78 mN/m. The flow of O/W-$\mu$E was 3 l/h; the flow ratio of O/W-$\mu$E and oil was 10:1. The pyrene concentration in the O/W-$\mu$E could be lowered to below 1.3 mg/l that is, to 4.5% of the original concentration.

Organic compounds which are present in aqueous solutions of sufficiently hydrophilic non-ionic surfactants, that is, respectively, in an oil-in-water micro-emulsion (O/W-$\mu$E) in a solubilized or a dispersion form could be extracted from the surfactant containing phase using vegetable oils are to be understood using vegetable oils or the esters thereof such as rapemethylester (RME). O/W-$\mu$E are to be understood as thermodynamically stable mixtures of surfactants, a liquid which does not mix with water and water wherein the organic compounds are present in a dispersed fashion. With the liquid/liquid extraction, the organic compounds transfer substantially completely to the organic phase.

Preferably, the surfactant-containing solutions or, respectively, O/W-$\mu$E are recirculated in an environmentally desirable manner.

Prerequisites for an economical processing are an effective extraction of the solubilized or dispersed substances, only a small co-extraction of the surfactant and a high processing volume. All this can be achieved with the process according to the invention. It is particularly pointed out that a high processing volume can be obtained by using, in accordance with the invention, a centrifugal extractor.

Areas of application for the process are particularly the extraction of contaminants from soil washing procedures and the isolation of organic synthesis products.

The centrifugal extractor used in the process is commercially available and is used for liquid—liquid extractions. However, use of the apparatus for the extraction of surfactants-containing solutions and the subsequent reuse of these solutions has not been considered to be feasible, that is, it has not even been taken into consideration for the reasons mentioned earlier. The particular problem encountered with surfactants-containing solutions especially with the use of non-ionic surfactants resides—as mentioned earlier—in the formation of emulsions which becomes particularly critical with the intense mixing perfomed in a centrifugal extractor. For example, the extraction of a 5% solution of the surfactant Marlipal 24/70, an alkyl-polyglycol ether with $C_{12}$- and $C_{14}$ alkyl chains and, on the average, 7 ethylene oxide units was found to be impossible. The emulsions obtained with the extraction could not be separated into an oil and a water phase. Surprisingly, it was found however that the dependency of the emulsions formation and/or stability on the hydrophilicity of the surfactant is so strong that, for a 1% solution of the surfactant Marlipal 24/200, an alkylpolyglycol ether with $C_{12}$ and $C_{14}$-alkyl chains and, on the average, 20 ethyleneoxide units, an excellent extraction of the contaminants and a good separation of the phases could be obtained. The extraction was much better than in an extraction column. Particularly, the processing volume was substantially higher.

As a criterion for the selection of the surfactant, the interfacial tension between the surfactant-containing solution and the organic phase may be used. A value of about 1 mN/m has been found to be sufficient.

Extractions of 5% Marlipal-24/70 and Marlipal 24/200 solutions using an extraction column resulted in substantially lower extraction yields at substantially lower processing volumes of 210 and, respectively, 270 ml/min. The remaining content of pyrene was always above 7% of the original concentration of the O/W-$\mu$E.

What is claimed is:

1. A process for the extraction of organic compounds from aqueous solutions containing non-ionic surfactants, comprising the steps of:

intensely mixing the aqueous solution with a liquid which does not mix with water such that a mixture is formed having a particle size in the disperse phase of 0.1 to 10 $\mu$m and wherein there is an interphase tension between the liquid which does not mix with water and the aqueous solution of at least 1.5 mN/m, whereby the organic compounds transfer from the aqueous solution containing the non-ionic surfactants to the liquid which does not mix with the water, and centrifuging the mixture of the surfactants containing aqueous solution and the liquid which does not mix with water for separating said liquid including said organic compounds from said surfactants containing aqueous solution.

2. A process according to claim 1, wherein the mixing and centrifuging steps are performed in a centrifugal extractor.

3. A process according to claim 1, wherein the separated liquid which does not mix with water is at least partially re-used in said mixing step.

4. A process according to claim 1, wherein said aqueous solution which contains non-ionic surfactants is an oil-in-water micro-emulsion.

* * * * *